US011955896B2

(12) United States Patent
Liu et al.

(10) Patent No.: US 11,955,896 B2
(45) Date of Patent: Apr. 9, 2024

(54) BIAS POWER REGULATOR CIRCUIT FOR ISOLATED CONVERTERS WITH A WIDE OUTPUT VOLTAGE RANGE

(71) Applicant: TEXAS INSTRUMENTS INCORPORATED, Dallas, TX (US)

(72) Inventors: Pei-Hsin Liu, Westford, MA (US); Richard Lee Valley, Nashua, NH (US); Bharath Balaji Kannan, Merrimack, NH (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 131 days.

(21) Appl. No.: 17/686,376

(22) Filed: Mar. 3, 2022

(65) Prior Publication Data

US 2022/0190730 A1 Jun. 16, 2022

Related U.S. Application Data

(62) Division of application No. 16/596,954, filed on Oct. 9, 2019, now Pat. No. 11,271,483.

(Continued)

(51) Int. Cl.
*H05B 45/37* (2020.01)
*G06F 1/26* (2006.01)
(Continued)

(52) U.S. Cl.
CPC ........ *H02M 3/33523* (2013.01); *G06F 1/266* (2013.01); *G06F 13/4282* (2013.01);
(Continued)

(58) Field of Classification Search
CPC ........... H02M 3/33523; H02M 1/0032; H02M 1/0009; H02M 1/08; H05B 45/37; G06F 1/266; G06F 13/4282; G06F 2213/0042
See application file for complete search history.

(56) References Cited

U.S. PATENT DOCUMENTS

| 4,837,670 A | 6/1989 | Diaz |
| 5,638,262 A | 6/1997 | Brown |

(Continued)

FOREIGN PATENT DOCUMENTS

| EP | 0466627 A2 | 1/1992 |
| WO | 2021059074 A1 | 4/2021 |

OTHER PUBLICATIONS

Search Report for PCT Application No. PCT/US19/56648, Date of mailing of the international search report Dec. 19, 2019, 1 page.

(Continued)

*Primary Examiner* — Henry Luong
(74) *Attorney, Agent, or Firm* — Michelle F. Murray; Frank D. Cimino

(57) ABSTRACT

A system includes an isolated converter having a power transformer with a primary winding, a secondary winding, and an auxiliary winding. The system also includes: 1) a first switch coupled to the primary winding; 2) a switch controller coupled to the first switch; and 3) a bias power regulator circuit coupled to the auxiliary winding and the switch controller. The bias power regulator circuit includes a second switch. The bias power regulator circuit is configured to provide a bias supply output voltage to the switch controller based on a first set of modes that modulate a switching frequency of the second switch and based on a second mode in which the second switch stays off.

7 Claims, 8 Drawing Sheets

Related U.S. Application Data

(60) Provisional application No. 62/746,876, filed on Oct. 17, 2018.

(51) Int. Cl.
    *G06F 13/42* (2006.01)
    *H02M 1/08* (2006.01)
    *H02M 3/335* (2006.01)
    *H02M 1/00* (2006.01)

(52) U.S. Cl.
    CPC ............. *H02M 1/08* (2013.01); *H05B 45/37* (2020.01); *G06F 2213/0042* (2013.01); *H02M 1/0009* (2021.05); *H02M 1/0032* (2021.05)

(56) References Cited

U.S. PATENT DOCUMENTS

| | | |
|---|---|---|
| 6,944,034 B1 | 9/2005 | Shteynberg et al. |
| 8,289,731 B2 | 10/2012 | Spiridon et al. |
| 8,730,688 B2 | 5/2014 | Hsu |
| 9,882,500 B2 | 1/2018 | Lin et al. |
| 9,935,559 B2 | 4/2018 | Kong et al. |
| 10,503,187 B1 | 12/2019 | Hodge, Jr. |
| 2009/0190379 A1 | 7/2009 | Melanson et al. |
| 2009/0237960 A1 | 9/2009 | Coulson et al. |
| 2013/0235621 A1 | 9/2013 | Yan et al. |
| 2014/0268913 A1 | 9/2014 | Zheng et al. |
| 2015/0236597 A1 | 8/2015 | Hinz et al. |
| 2018/0034372 A1 | 2/2018 | Jacobson |
| 2018/0123581 A1 | 5/2018 | Chiu et al. |
| 2018/0175673 A1 | 6/2018 | Blakely et al. |
| 2019/0013737 A1 | 1/2019 | Lin |
| 2019/0044449 A1 | 2/2019 | Li et al. |
| 2019/0199434 A1 | 6/2019 | Ripley |
| 2020/0014304 A1 | 1/2020 | Chang |

OTHER PUBLICATIONS

European International Search Report dated Oct. 21, 2021.
XP-002517272, Low Cost Green-Mode PWM Controller for Flyback Converters, SG6859, System General Fairchild Semiconductor, Sep. 28, 2007, 13 pages.
Intent to Grant document for corresponding EP application T79943EP01, dated Oct. 17, 2022.

BIAS POWER REGULATOR CIRCUIT FOR ISOLATED CONVERTERS WITH A WIDE OUTPUT VOLTAGE RANGE

CROSS-REFERENCE TO RELATED APPLICATIONS

This application is a divisional of U.S. patent application Ser. No. 16/596,954 filed Oct. 9, 2019, which claims priority to U.S. Provisional Patent Application No. 62/746,876 filed Oct. 17, 2018, all of which are hereby incorporated by reference.

BACKGROUND

Isolated converters refer to converters that provide full galvanic isolation between input and output circuits using a power transformer with a primary winding and a secondary winding. Some isolated converters use a power transformer with an auxiliary winding separate from the secondary winding to supply power (a bias supply voltage) to control circuitry (e.g., a pulse-width modulation controller) for one or more isolated converter switches. For isolated converters with wide output voltage range (e.g., a USB power delivery adapter or light-emitting diode driver), it is challenging to provide a usable bias supply voltage to the control circuitry directly from the auxiliary winding of the power transformer. This is because some regulation circuitry is needed to provide a usable bias supply voltage in a wide output voltage range scenario, which undesirably increases cost, size, and power consumption of the converter. Previous regulation circuitry options to supply power to control circuitry of an isolated converter using an auxiliary winding of the power transformer are lossy and increase the controller cost with a higher voltage rating in order to handle the higher rectified positive auxiliary winding voltage at the high output voltage condition.

SUMMARY

In at least one example, a system comprises an isolated converter having a power transformer with a primary winding, a secondary winding, and an auxiliary winding. The isolated converter also comprises a first switch coupled to the primary winding and a switch controller coupled to the first switch. The isolated converter also comprises a bias power regulator circuit coupled to the auxiliary winding and the switch controller, wherein the bias power regulator circuit includes a second switch. The bias power regulator circuit is configured to provide a bias supply output voltage to the switch controller based on a first set of modes that modulate a switching frequency of the second switch and based on a second mode in which the second switch stays off.

In at least one example, a control circuit for an isolated converter with a power transformer having an auxiliary winding is provided. The control circuit comprises a bias supply input node and a bias supply output node. The control circuit also comprises a pulse-width modulation (PWM) controller coupled to the bias supply output node. The control circuit also comprises a bias power regulator circuit between the bias supply input node and the bias supply output node. The bias power regulator circuit comprises a forward path between the bias supply input node and the bias supply output node. The bias power regulator circuit also comprises a switch coupled between the forward path and a ground node. The bias power regulator circuit also comprises a modulation circuitry coupled to a control terminal of the switch. The bias power regulator circuit also comprises a mode controller coupled to the modulation circuitry.

In at least one example, an integrated circuit comprises an isolated converter switch control node, an auxiliary winding node, and a bias supply voltage node. The integrated circuit also comprises an isolated converter switch controller coupled to the bias supply voltage node and the isolated converter switch control node. The integrated circuit also comprises a bias power regulator circuit coupled to the auxiliary winding node and the bias supply voltage node, wherein the bias power regulator circuit comprises a switch. The bias power regulator circuit is configured to provide a bias supply voltage to the isolated converter switch controller based on a plurality of modulation modes that modulate a switching frequency of the switch and based on a forward mode in which the switch stays off.

In at least one example, an integrated circuit comprises a bias supply input node and a bias supply output node. The integrated circuit also comprises a bias power regulator circuit between the bias supply input node and the bias supply output node. The bias power regulator circuit comprises a switch. Also, the bias power regulator circuit is configured to provide a bias supply output voltage to the bias supply output node based on modulating a switching frequency of the switch if a voltage level at the bias supply input node is greater than a bias supply input threshold and based on using a forward path with the switch off if the voltage level at the bias supply input node is not greater than the bias supply input threshold.

DETAILED DESCRIPTION

Figure 1:
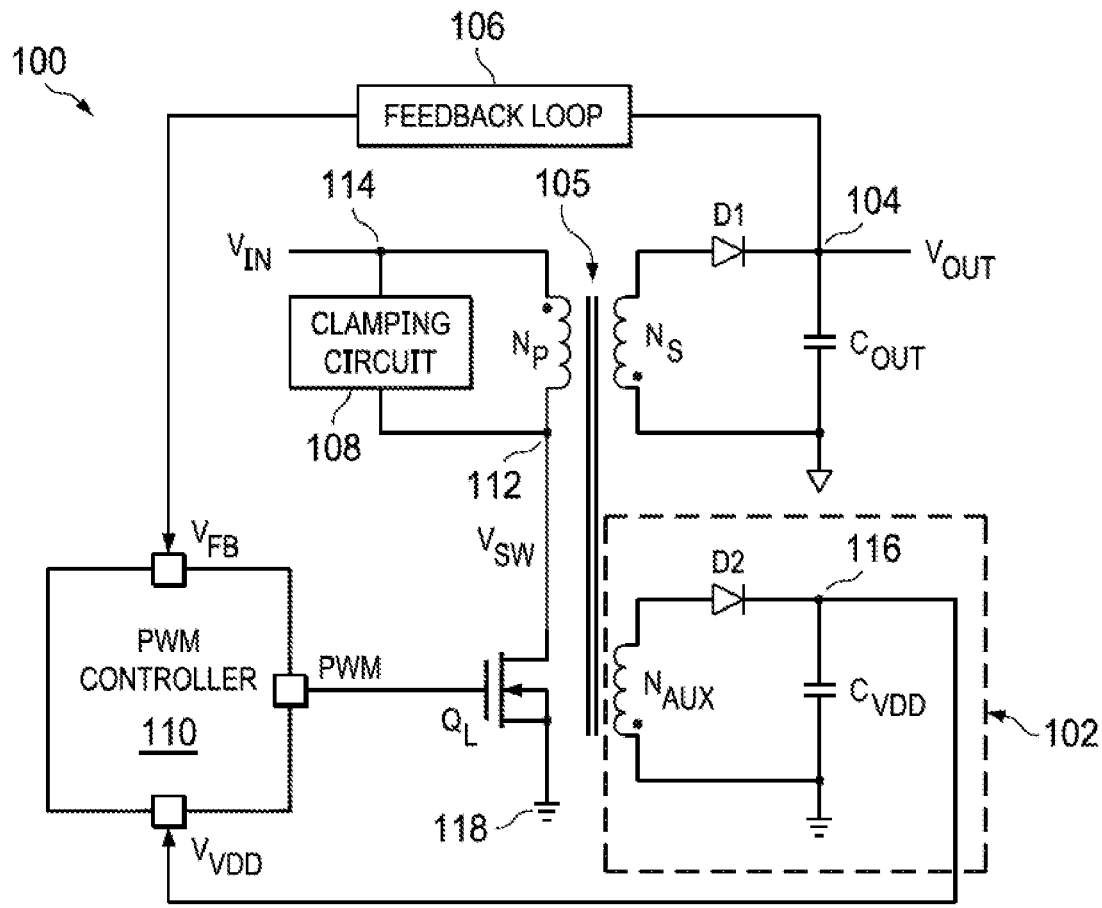
FIG. 1 is a diagram showing an isolated converter in some examples.

In this description, bias power regulator options for an isolated converter have a power transformer with an auxiliary winding. In the described examples, a bias power regulator circuit with a switch is placed between the auxiliary winding and an isolated converter switch controller (to control one or more isolated converter switches), where the bias power regulator circuit supplies a bias supply voltage (referred to $V_{VDD}$ herein) to the isolated converter switch controller based on a bias supply input voltage (referred to $V_{BIN}$ herein) obtained from the auxiliary winding. In some examples, the bias power regulator circuit uses different modes or options to provide $V_{VDD}$ to the isolated converter switch controller based on its operating conditions, such as $V_{BIN}$ and $V_{VDD}$. In some examples, mode changes are made by a primary controller based on its operating conditions (e.g., load, survival mode, start-up, etc.).

A first mode or option of the bias power regulator circuit is referred to herein as a forward mode. In the forward mode, the switch of the bias power regulator circuit stays off and a forward path between the auxiliary winding and the isolated converter switch controller is used. The forward mode is used when $V_{BIN}$ is greater than a bias supply input threshold (VBIN_TH).

A second mode or option of the bias power regulator circuit is referred to herein as a constant off-time modulation mode. In the constant off-time modulation mode, the switch of the bias power regulator circuit is on/off modulated using a constant off-time (e.g., 250 ns). In some examples, the constant off-time modulation mode is used when $V_{BIN}$ is less than or equal to VBIN_TH and when the isolated converter is in a light load condition. With the constant off-time modulation mode (a type of continuous conduction mode), power delivery for $V_{VDD}$ is quick to avoid $V_{VDD}$ falling below an undervoltage lockout (UVLO) threshold of the isolated converter switch controller. In order for the constant off-time modulation mode to keep $V_{VDD}$ above the UVLO off threshold, some $V_{BIN}$ (e.g., greater than a minimum $V_{BIN}$ level and less than VBIN_TH) at the auxiliary winding is needed. Accordingly, in some examples, the isolated converter switch controller is configured to periodically operate an isolated converter switch to provide energy pulses to the auxiliary winding while the isolated converter is in a light load condition. In this manner, the bias power regulator circuit in the constant off-time modulation mode can keep $V_{VDD}$ above the UVLO off threshold while the isolated converter is in a light load condition.

The operations of the isolated converter switch controller and/or the bias power regulator circuit during a light load condition of the isolated converter are referred to herein as survival mode operations (to ensure $V_{VDD}$ stays above the UVLO off threshold to keep the isolated converter switch controller from shutting down). In one example, the survival mode operations involve the isolated converter switch controller receiving signals from the bias power regulator circuit to control the timing and/or duration of energy pulses during the light load condition of the isolated converter. In another example, the survival mode operations involve the isolated converter switch controller being programmed or otherwise adjustable to control the timing and/or duration of energy pulses during the light load condition of the isolated converter without communications from the bias power regulator circuit.

A third mode or option of the bias power regulator circuit is referred to herein as a constant peak-current modulation mode. In the constant peak-current modulation mode, the switch of the bias power regulator circuit is on/off modulated to maintain $V_{VDD}$ at a target reference voltage. In some examples, the constant peak-current modulation mode is used when $V_{BIN}$ at the auxiliary winding is less than or equal to VBIN_TH and when the isolated converter is not in a light load condition. With the constant peak-current modulation mode, the peak magnetizing current of an inductor included with the bias power regulator circuit is constant. Thus, the switching frequency of the bias power regulator circuit's switch is a function of $V_{BIN}$ or the output voltage (VOUT) of the isolated converter during constant peak-current modulation mode operations, since $V_{BIN}$ is proportional to VOUT. As needed, the bias power regulator circuit switches between the first, second, and third modes to provide $V_{VDD}$ to the isolated converter switch controller. To provide a better understanding, various isolated converter and bias power regulator circuit options and related waveforms are described using the figures as follows.

FIG. 1 is a diagram showing an isolated converter 100 in some examples. As shown, the isolated converter 100 includes a power transformer 105 and switch ($Q_L$) with a first current terminal, a second current terminal, and a control terminal. More specifically, the first current terminal of $Q_L$ is coupled to a primary winding ($N_P$) of the power transformer 105, and the second current terminal of $Q_L$ is coupled to a ground node 118. Also, the control terminal of $Q_L$ is coupled to a pulse-width modulation (PWM) controller 110 (an example of an isolated converter switch controller). Also represented in FIG. 1 is an input supply voltage (VIN) node 114, a switch node 112, and a clamping circuit 108 between the VIN node 114 and the switch node 112, where the clamping circuit 108 limits the voltage differential between the VIN node 114 and the switch node 112. Also, a feedback loop 106 is between an output node 104 of the isolated converter 100 and the PWM controller 110, where the output node 104 is coupled to a secondary winding ($N_S$) of the power transformer 105 via a diode (D1). At the output node 104, an output capacitor (COUT) stores an output voltage (VOUT) for use by a load (not shown).

In the example of FIG. 1, the power transformer 105 also includes an auxiliary winding ($N_{AUX}$) that is part of a bias supply circuit 102 with bias supply node 116. As shown, the bias supply circuit 102 also includes a capacitor ($C_{VDD}$) with a first (e.g., top) plate coupled to the bias supply node 116 and coupled to $N_{AUX}$ via a diode (D2). A second (e.g., bottom) plate of $C_{VDD}$ is coupled to a primary ground node. In operation, the bias supply circuit 102 provides a bias supply voltage ($V_{VDD}$) to the PWM controller 110. The topology of the isolated converter 100 enables the PWM controller 110 to be powered by the bias supply circuit 102. However, for scenarios with VOUT variance, the bias supply circuit 102 may not be able to supply a proper $V_{VDD}$.

As an example, if the PWM controller 110 has a UVLO off threshold of 10V, $N_{AUX}=N_S$, and $V_{VDD}$=VOUT=3.3V to 21V, then $V_{VDD}$ may be too low, resulting in the isolated converter 100 being unable to start (the PWM controller 110 will be off). In another example, if $N_{AUX}=4*N_S$, and $V_{VDD}$=13.2V to 84V for VOUT=3.3V to 21V, then $V_{VDD}$ may be too high, resulting in damage to standby power and increased cost of the isolated converter switch controller with a higher voltage-rating.

Figure 2:
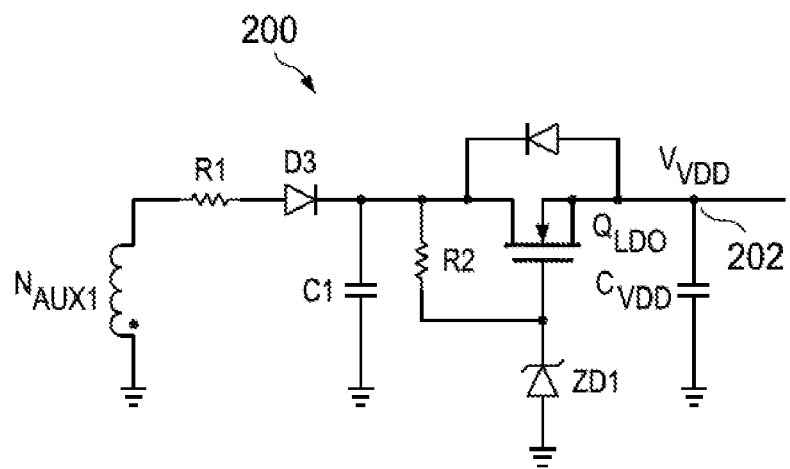
FIG. 2 is a schematic diagram showing a bias power regulator circuit in some examples.

FIG. 2 is a schematic diagram showing a bias supply circuit 200 in some examples. The bias supply circuit 200 provides a linear regulator solution to the VOUT variance issue discussed for FIG. 1. As shown, the bias supply circuit 200 includes a resistor (R1) and a diode (D3) coupled to an auxiliary winding ($N_{AUX1}$). A capacitor (C1) stores the charge received from $N_{AUX1}$, and the charge is regulated using pass element ($Q_{LDO}$) to provide $V_{VDD}$ at node 202. As shown, the bias supply circuit 200 also includes a second resistor (R2) coupled between the first current terminal and the control terminal of $Q_{LDO}$. Also, a Zener diode (ZD1) is coupled between the control terminal of $Q_{LDO}$ and a ground node. At node 202, a capacitor ($C_{VDD}$) is used to store $V_{VDD}$ for use by an isolated converter switch controller. If the bias supply circuit 200 is used instead of the bias supply circuit 102 in an isolated converter such as the isolated converter 100, then VOUT variance becomes tolerable. However, power loss of a linear regulator solution greatly impairs system efficiency. Also, a large-size for $Q_{LDO}$ is needed to resolve thermal issues, which increases cost and footprint size.

Figure 3:
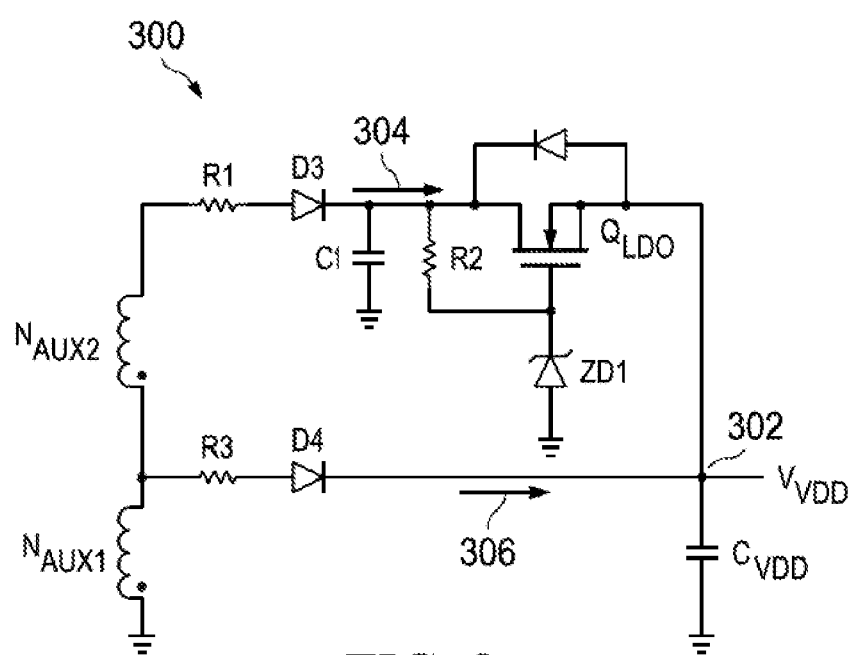
FIG. 3 is a schematic diagram showing another bias power regulator circuit in some examples.

FIG. 3 is a schematic diagram showing another bias supply circuit 300 in some examples. As shown, the bias supply circuit 300 includes two auxiliary windings ($N_{aux1}$ and $N_{aux2}$) and two regulation paths 304 and 306. The first regulation path 304 includes the components described for the linear regulator solution of the bias supply circuit 200. The second regulation path 306 includes a third resistor (R3) and a diode (D4). At node 302, $V_{VDD}$ is available for use by an isolated converter switch controller. With the bias supply circuit 300, regulator losses at high output voltage conditions is reduced, but remain at low output voltage conditions. Also, the transformer winding construction to form $N_{aux1}$ and $N_{aux2}$ increases complexity.

Figure 4:
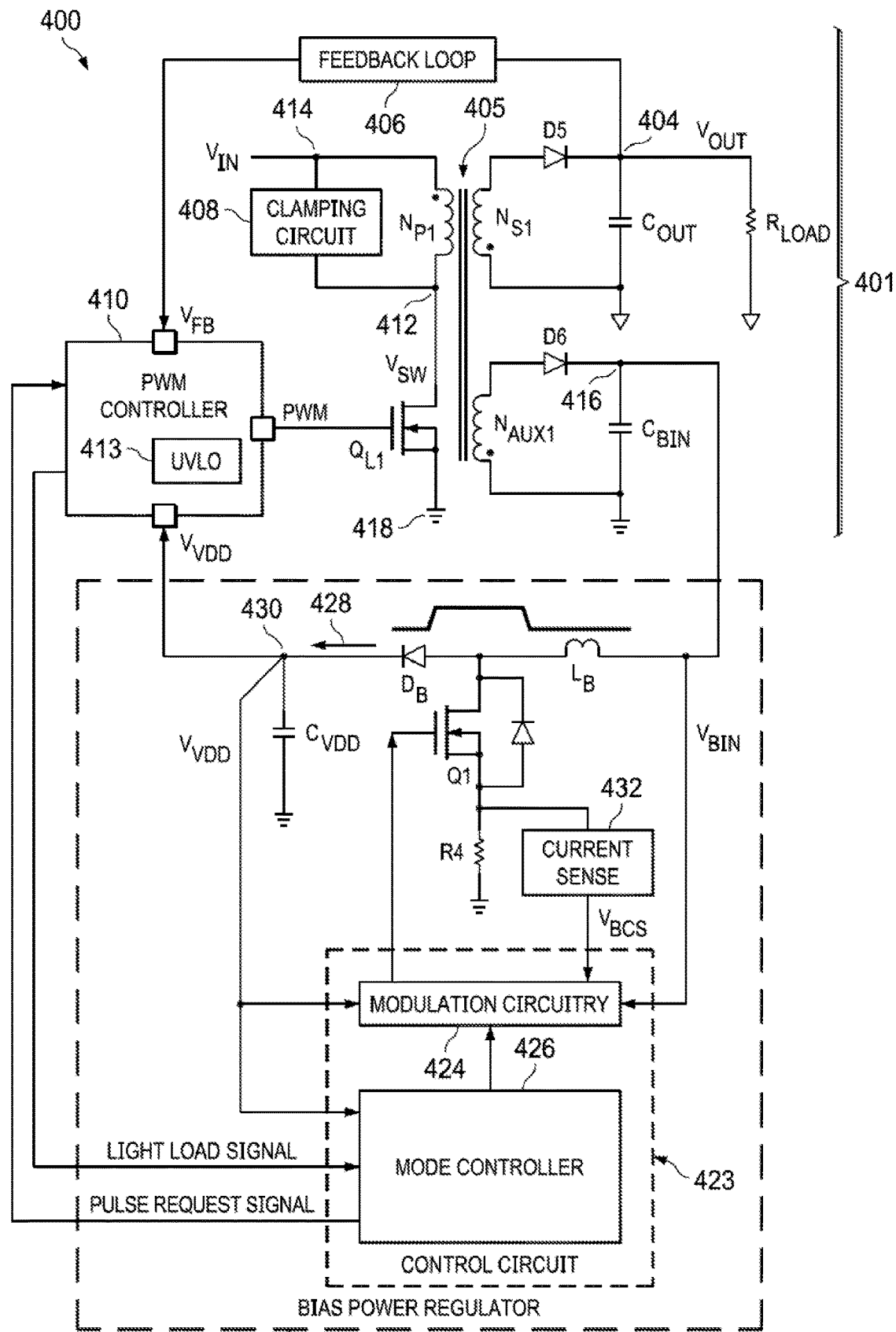
FIG. 4 is a diagram showing a system in some examples.

FIG. 4 is a diagram showing a system 400 in some examples. In the example of FIG. 4, the system 400 includes an isolated converter 401 with a topology similar to the topology represented for the isolated converter 100 of FIG. 1. As shown, the isolated converter 401 includes a power transformer 405 and switch ($Q_{L1}$) with a first current terminal, a second current terminal, and a control terminal. More specifically, the first current terminal of $Q_{L1}$ is coupled to a primary winding ($N_{P1}$) of the power transformer 405, and the second current terminal of $Q_{L1}$ is coupled to a ground node 418. Also, the control terminal of $Q_{L1}$ is coupled to a PWM controller 410 (an example of an isolated converter switch controller). In the example of FIG. 4, the PWM controller 410 includes a UVLO circuit 413 to shut down the PWM controller 410 if $V_{VDD}$ falls below a UVLO off threshold. Also represented in FIG. 4 is a VIN node 414, a switch node 412, and a clamping circuit 408 between the VIN node 414 and the switch node 412, where the clamping circuit 408 limits the voltage differential between the VIN node 414 and the switch node 412. Also, a feedback loop 406 is between an output node 404 of the isolated converter 401 and the PWM controller 410, where the output node 404 is coupled to a secondary winding ($N_{S1}$) of the power transformer 405 via a diode (D5). At the output node 404, an output capacitor (COUT) stores an output voltage (VOUT) for use by a load (RLOAD). In different examples, RLOAD corresponds to a USB PD adaptor, an LED driver, or another load.

In the example of FIG. 4, the power transformer 405 also includes an auxiliary winding ($N_{AUX1}$). As shown, $N_{AUX1}$ is coupled to a bias supply input ($V_{BIN}$) node 416 via a diode (D6), where at the $V_{BIN}$ node 416 is stored by a capacitor (CBIN). In the system 400, a bias power regulator circuit 422 with a switch (Q1) is coupled between the $V_{BIN}$ node 416 and the PWM controller 410. In operation, the bias power regulator circuit 422 is configured to supply $V_{VDD}$ to the PWM controller 410 based on $V_{BIN}$ and various modes of operation.

In some examples, the modes of operation of the bias power regulator circuit 422 include a forward mode that uses a forward path 428 of the bias power regulator circuit 422 is when $V_{BIN}$ is greater than a threshold (VBIN_TH). In the forward mode, Q1 stays off and $V_{VDD}$ follows $V_{BIN}$. Another mode of operation of the bias power regulator circuit 422 is a constant off-time modulation mode that is used when $V_{BIN}$ is less than or equal to VBIN_TH and the isolated converter 401 is in a light load condition. In the constant off-time modulation mode, Q1 is on/off modulated based on a constant off-time (e.g., 250 ns) selected to maintain $V_{VDD}$ above the UVLO off threshold of the PWM controller 410. The constant off-time modulation is a type of continuous conduction mode (CCM) that is used to quickly pass energy to a $V_{VDD}$ node 430 of the bias power regulator circuit 422 so that $V_{VDD}$ stays above the UVLO off threshold. When the constant off-time modulation mode is used, the PWM controller 410 of isolated converter 401 provides periodic control pulses to $Q_{L1}$ so that $N_{AUX1}$ receives energy and $V_{BIN}$ is sufficiently high. These operations of the PWM controller 410 are separate from VOUT regulation and are referred to herein as survival mode operations. In some examples, survival mode operations of the PWM controller 410 involve communications from the bias power regulator circuit 422 (e.g., to direct the timing and/or duration of the control pulses provided by the PWM controller 410 during survival mode operations). In other examples, the operations of the PWM controller 410 are programmed or adjusted so that the timing and/or duration of the control pulses provided by the PWM controller 410 during the survival mode keeps $V_{VDD}$ above the UVLO off threshold.

A third mode of operation of the bias power regulator circuit 422 is a constant peak-current modulation mode that is used when $V_{BIN}$ is less than or equal to VBIN_TH and the isolated converter 401 is not in a light load condition. In the constant peak-current modulation mode, $V_{VDD}$ is regulated to a target reference voltage. This third mode of operation (the constant peak-current modulation mode) is a type of discontinuous conduction mode (DCM).

In the example of FIG. 4, the forward path 428 used for the forward mode includes an inductor ($L_B$) with a first end coupled to the $V_{BIN}$ node 416 and a second end coupled to the anode of a diode ($D_B$). The cathode of $D_B$ is coupled to a $V_{VDD}$ node 430 of the bias power regulator circuit 422, where a capacitor ($C_{VDD}$) stores $V_{VDD}$ at the $V_{VDD}$ node 430 for use by the PWM controller 410. When $V_{BIN}$ is higher than VBIN_TH, the forward path 428 is used, Q1 stays off, and $V_{VDD}$ follows $V_{BIN}$ with a diode drop.

To support the forward mode and the other modes (e.g., the constant off-time modulation mode and the constant peak-current modulation mode), the bias power regulator circuit 422 includes a control circuit 423. In the example of FIG. 4, the control circuit 423 includes modulation circuitry 424 and a mode controller 426. As shown, the modulation circuitry 424 is coupled to the control terminal of Q1. Meanwhile, the first current terminal of Q1 is coupled to the anode of $D_B$ and to the second end of $L_B$. Also, the second current terminal of Q1 is coupled to a ground node via a resistor (R4).

In the example of FIG. 4, the control circuit 423 is configured to control Q1 using the supported modes (the forward mode, the constant off-time modulation mode, and the constant peak-current modulation mode), where selection of the different supported modes depends on $V_{BIN}$, $V_{VDD}$, and a load condition of the isolated converter 401. As described herein, the forward mode is used when $V_{BIN}$ is greater than VBIN_TH. Also, the constant off-time modulation mode is used when $V_{BIN}$ is less than or equal to VBIN_TH, and when the isolated converter 401 is in a light load condition. Also, the constant peak-current modulation mode is used when $V_{BIN}$ is less than or equal to VBIN_TH, and when the isolated converter 401 is not in a light load condition.

In the example of FIG. 4, the mode controller 426 performs various operations during a constant peak-current modulation mode including receiving a light load signal from the PWM controller 410 and sending pulse request signals to the PWM controller 410. Because the constant peak-current modulation mode is used to keep $V_{VDD}$ above a UVLO off threshold of the PWM controller 410, the operations of the mode controller 426 and/or the PWM controller 410 during the constant off-time modulation mode are referred to as survival mode operations (the PWM controller 410 will turn off without the survival mode operations). In other examples, the PWM controller 410 may be programmed to provide survival mode operations without pulse request signals from the mode controller 426.

In the example of FIG. 4, the constant peak-current modulation mode operations are a function of $V_{VDD}$ and a current sensed at the second current terminal of Q1. In some examples, a current sense circuit 432 is placed between the second current terminal of Q1 and R4 to provide a current sense voltage value ($V_{BCS}$) that is used by the modulation circuitry 424 during constant peak-current modulation mode operations.

In some examples the PWM controller 410 and the bias power regulator circuit 422 are packaged or otherwise combined as a commercial product (e.g., an integrated circuit die or packaged chip). In other examples, the PWM controller 410 and the bias power regulator circuit 422 are separate commercial products (e.g., integrated circuit dies or packaged chips).

Figure 5:
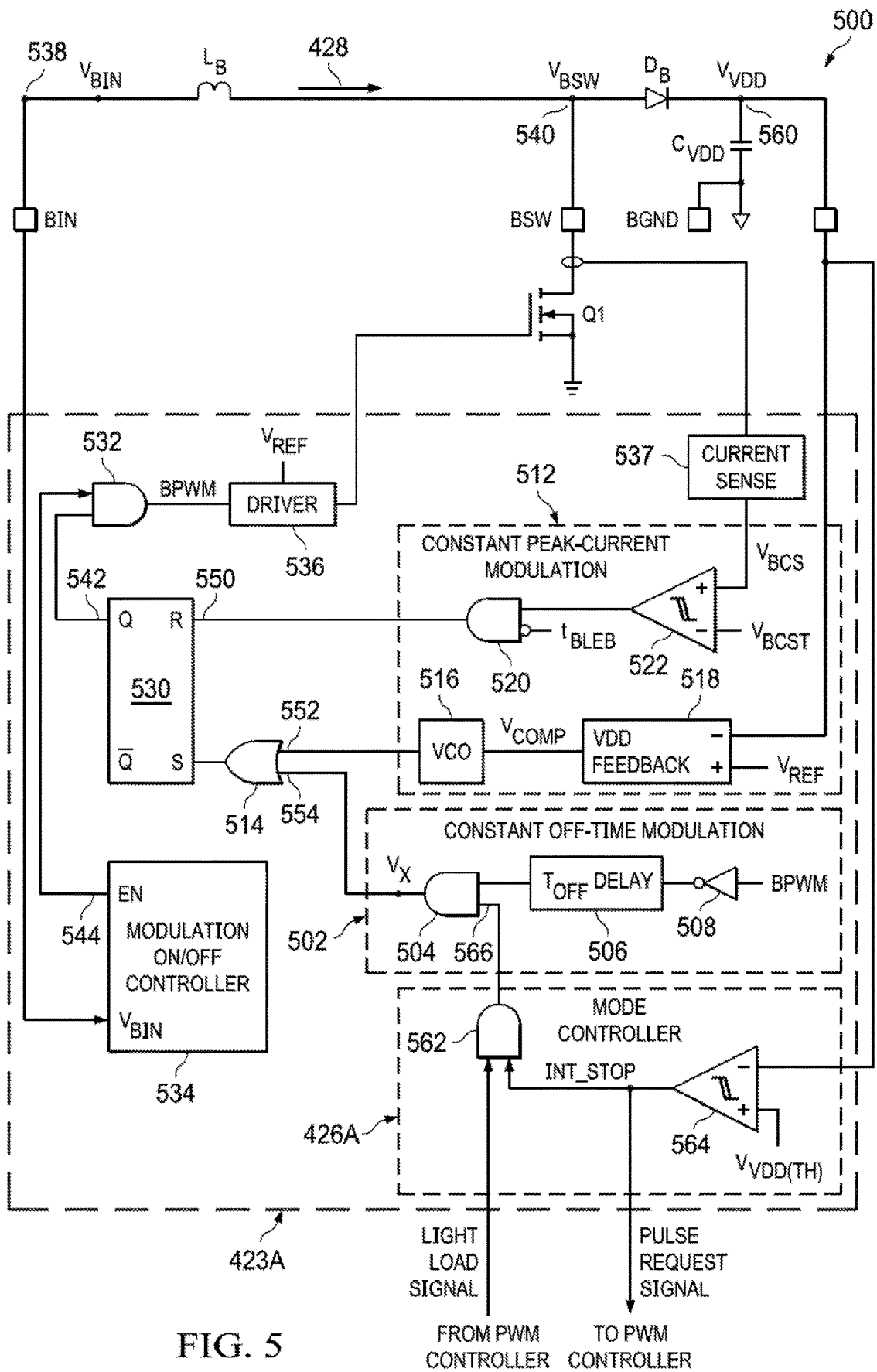
FIG. 5 is a diagram showing a bias power regulator circuit and isolated converter components in some examples.

FIG. 5 is a diagram showing a bias power regulator circuit 500 (an example of the bias power regulator circuit 422 in FIG. 4) in some examples. As shown, the bias power regulator circuit 500 includes $L_B$ and $D_B$ to provide the forward path 428 discussed in FIG. 4. The bias power regulator circuit 500 also includes Q1, which is coupled to a switch node 540 between $L_B$ and $D_B$. The bias power regulator circuit 500 also includes a control circuit 423A (an example of the control circuit 423 in FIG. 4) to control Q1. The control circuit 423A is configured to select the forward mode (Q1 off), the constant off-time modulation mode (Q1 on/off modulated using a constant off-time), or the constant peak-current modulation (Q1 on/off modulated using a target reference and current sense value), where the selection of the different modes is based on $V_{BIN}$ relative to a threshold (VBIN_TH) and based on a load condition of the associated isolated converter.

As shown, the control circuit 423A of FIG. 5 includes a modulation on/off controller 534 coupled to a $V_{BIN}$ node 538 (an example of the $V_{BIN}$ node 416). When $V_{BIN}$ is higher than VBIN_TH, the enable signal 544 output from the modulation on/off controller 534 is de-asserted, resulting in Q1 being turned off. While Q1 stays off and $V_{BIN}$ is higher than VBIN_TH, the forward mode of the bias power regulator circuit 500 is used.

The control circuit 423A also includes a constant off-time modulation circuit 502 and a constant peak-current modulation circuit 512 for use when $V_{BIN}$ is not higher than VBIN_TH. In such case, the modulation on/off controller 534 outputs an asserted enable signal 544. Comparing FIG. 5 with FIG. 4, the constant off-time modulation circuit 502, the constant peak-current modulation circuit 512, and the modulation on/off controller 534 correspond to the modulation circuitry 424 of FIG. 4. Also, other components represented in the control circuit 423A in FIG. 5 (e.g., the AND gate 532, the driver 536, the S-R latch 530, and the OR gate 514) also may be considered part of the modulation circuitry 424 of FIG. 4.

In the example of FIG. 5, the enable signal 544 output from the modulation on/off controller 534 is input to an AND gate 532. The other input to the AND gate 532 is a control signal 542 from either the constant off-time modulation circuit 502 or the constant peak-current modulation circuit 512. When the enable signal 544 and the control signal 542 are high, the output of the AND gate 532 is high and corresponds to a bias PWM (BPWM) signal, which is fed into a driver 536. In FIG. 5, the driver 536 provides a drive signal to Q1 based on a reference voltage ($V_{REF}$), where the timing of the drive signal is based on BPWM.

In the example of FIG. 5, the control signal 542 is a latched control signal provided by an S-R latch 530. As shown, the R input for the S-R latch 530 is provided by a first output 550 (indicating sufficient current flow is available) of the constant peak-current modulation circuit 512, while the S input for the S-R latch 530 is provided by an OR gate 514 with a first input coupled to a second output 552 of the constant peak-current modulation circuit 512 and with a second input coupled to an output 554 of the constant off-time modulation circuit 502.

As shown, the first output 550 of the constant peak-current modulation circuit 512 is generated by a comparator 522 and an AND gate 520. More specifically, the comparator 522 compares a sense current value ($V_{BCS}$) (indicating a current flow through Q1) with a sense current threshold ($V_{BCST}$), where $V_{BCS}$ is provided a current sense circuit 537. When $V_{BCS}$ is greater than $V_{BCST}$ the output of the comparator 522 is high. Otherwise, the output of the comparator 522 is low. As shown, the output of comparator 522 is one of the inputs to the AND gate 520. The other input to the AND gate 520 is a control signal ($t_{BLEB}$), where tBLEB is a one-shot pulse derived from the BPWM pulse used to blank the output of the comparator 522 for the duration of tBLEB. The output of the AND gate 520 is the first output 550 of the constant peak-current modulation circuit 512.

The second output 552 of the constant peak-current modulation circuit 512 is generated by a VDD feedback circuit 518 and voltage controlled oscillator (VCO) 516. As shown, the inputs to the VDD feedback circuit 518 include $V_{VDD}$ (from a $V_{VDD}$ node 560 of the bias power regulator circuit 500) and a reference voltage ($k \times V_{REF}$, where k is a scaling factor). The output of the VDD feedback circuit 518 is a comparison result ($V_{COMP}$), which is used to adjust the frequency of the second output 552 provided by the VCO 516.

Figure 9:
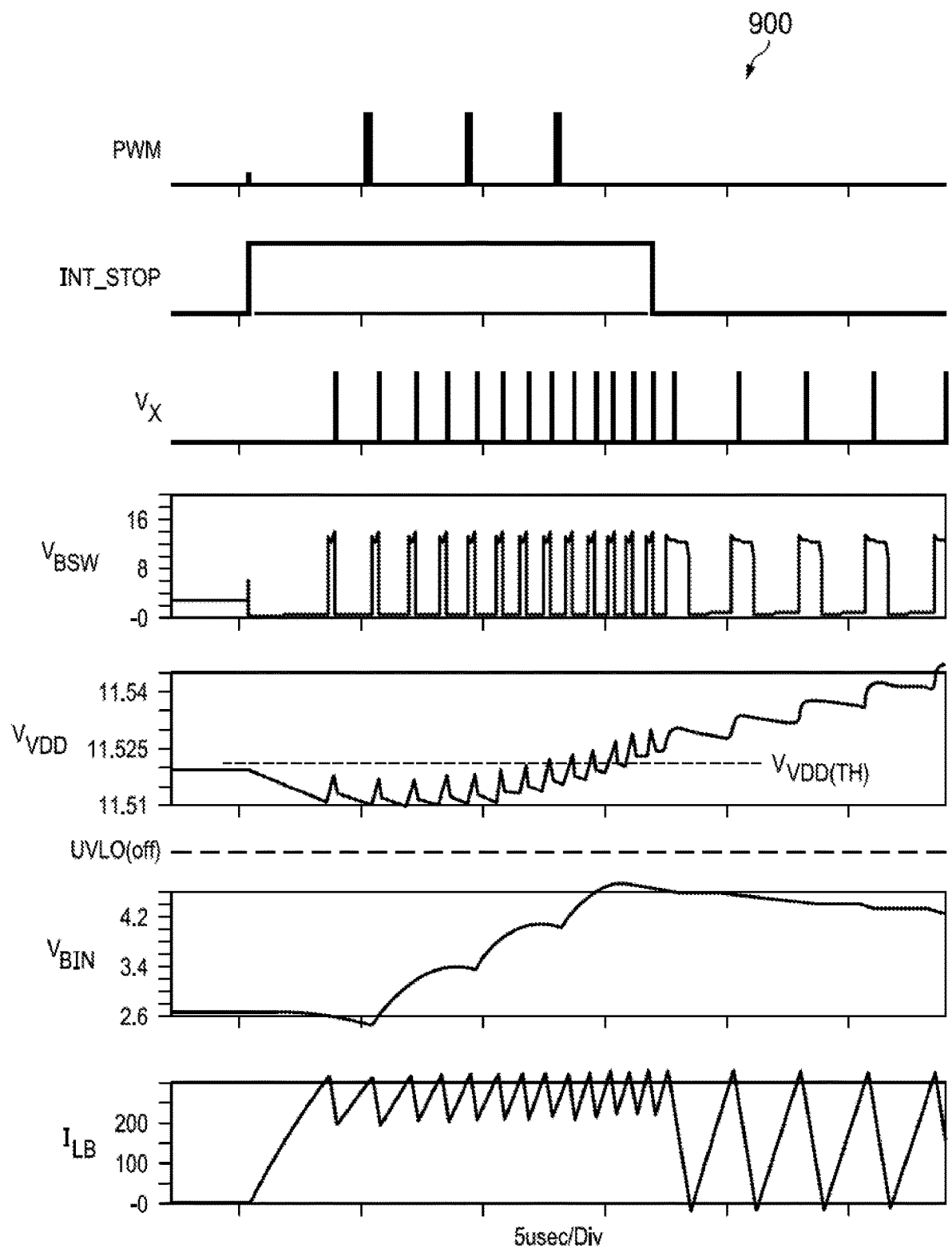
FIG. 9 is a timing diagram showing waveforms related to a constant off-time modulation mode of a bias power regulator circuit in some examples.

In the example of FIG. 5, the output of the constant off-time modulation circuit 502 is provided using an inverter 508, an off-time ($T_{OFF}$) delay circuit 506 and an AND gate 504. As shown, the input to the inverter 508 is the BPWM signal. The $T_{OFF}$ delay circuit 506 receives the output of the inverter 508 and provides an output based on a predetermined $T_{OFF}$ value. The output of the $T_{OFF}$ delay circuit 506 is one of the inputs to the AND gate 504. The other input to the AND gate 504 is provided by the mode controller 426A. More specifically, in the example of FIG. 5, the mode controller 426A includes an AND gate 562 and a comparator 564. As shown, the inputs to the comparator 564 include $V_{VDD}$ from the $V_{VDD}$ node 560 and a $V_{VDD}$ threshold ($V_{VDD(TH)}$). The output signal (INT_STOP) of the comparator 564 indicates when $V_{VDD}$ falls below $V_{VDD(TH)}$ and thus a pulse is needed to keep $V_{VDD}$ above a UVLO off threshold as described herein. When INT_STOP is high and there is a light load condition for the isolated converter, the output signal 566 of the AND gate 562 is high. As shown, the output signal 566 of the AND gate 562 is provided to the AND gate 504, which controls when the output of the constant off-time modulation circuit 502 is high. At the output of the AND gate 504, a "Vx" node is labeled, and a representative Vx signal corresponding to the Vx node is illustrated in FIG. 9.

In the example of FIG. 5, the constant off-time modulation circuit 502 controls modulation of Q1 when there is light load condition for the isolated converter and $V_{BIN}$ is equal to or less than VBIN_TH. For example, if a light load signal input to the AND gate 562 of the mode controller 426A is high and $V_{BIN}$ is equal to or less than VBIN_TH, then the constant off-time modulation circuit 502 is the active modulation controller for Q1. Otherwise, if a light load signal input to the AND gate 562 of the mode controller 426A is low and $V_{BIN}$ is equal to or less than VBIN_TH, then the constant peak-current modulation circuit 512 is the active modulation controller for Q1.

In the example of FIG. 5, the mode controller 426A is in communication with the PWM controller (e.g., the PWM controller 410 of FIG. 4) for an isolated converter to perform survival mode operations. As shown, such survival mode operations may involve receipt of the light load signal from a PWM controller as well as submission of pulse request signals to the PWM controller.

Figure 6:
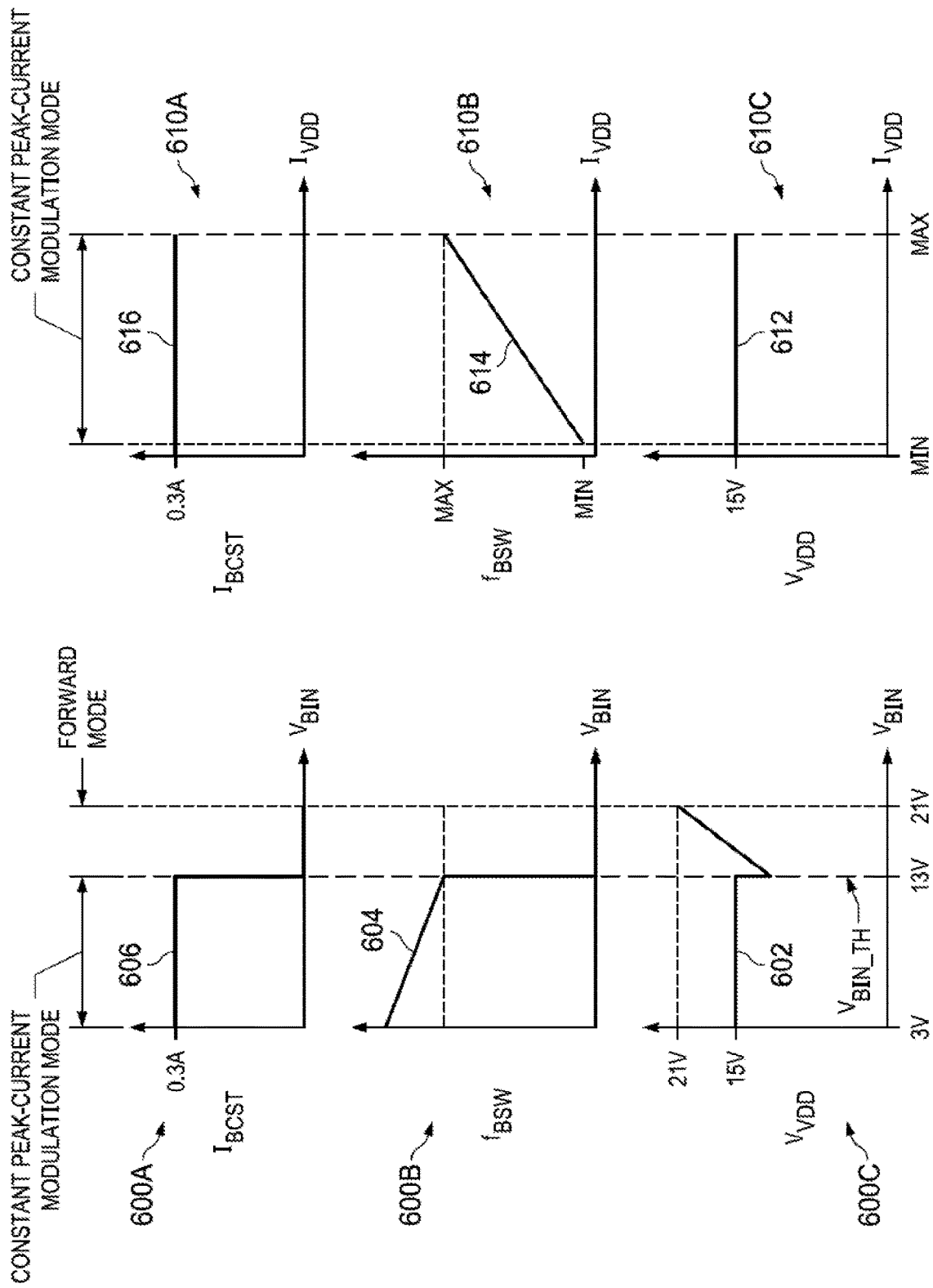
FIG. 6 is a set of graphs showing characteristics of a constant peak-current modulation mode of a bias power regulator circuit in some examples.

FIG. 6 is a set of graphs 600A-600C and 610A-610C showing characteristics of a constant peak-current modulation mode of a bias power regulator circuit (e.g., the bias power regulator circuit 422 in FIG. 4, or the bias power regulator circuit 500 in FIG. 5) in some examples. In graph 600A, the value of $I_{BCST}$ relative to $V_{BIN}$ is represented. As used herein, Ibcst is the boost's peak current, i.e. the peak current that is reached in the boost switch at the time the switch is turned off—a characteristic of both the described constant peak-current and constant off-time modulation modes.

As shown, $I_{BCST}$ stays at a first constant value (e.g., 0.3A) during the constant peak-current modulation mode) and drops to zero once $V_{BIN}$ is greater than VBIN_TH (once the forward mode starts). In graph 600B, the value of the switch frequency ($f_{BSW}$) for Q1 relative to $V_{BIN}$ is represented. As shown, $f_{BSW}$ linearly decreases as $V_{BIN}$ increases. Once $V_{BIN}$ is greater than VBIN_TH (once the forward mode starts), $f_{BSW}$ drops to zero. In graph 600C, the value of $V_{VDD}$ relative to $V_{BIN}$ is represented. As shown, $V_{VDD}$ is steady as $V_{BIN}$ increases. Once $V_{BIN}$ is greater than VBIN_TH (once the forward mode starts), $V_{BIN}$ increases linearly. In the examples of graphs 600A-600C, $V_{BIN}$ is represented as varying between 3V and 21V. In other examples, the range of $V_{BIN}$ may vary.

In graph 610A, the value of $I_{BCST}$ relative to $I_{VDD}$ is represented. As shown, $I_{BCST}$ stays at a constant value (e.g., 0.3A) as $I_{VDD}$ increases. In graph 610B, the value of $f_{BSW}$ relative to $I_{VDD}$ is represented. As shown, $f_{BSW}$ linearly increases (e.g., from a minimum value to a maximum value) as $I_{VDD}$ increases. In graph 610C, the value of $V_{VDD}$ relative to $I_{VDD}$ is represented. As shown, $V_{VDD}$ stays steady (e.g., at 15V in this example) as $I_{VDD}$ increases. In the examples of graphs 610A-610C, $I_{VDD}$ is represented as varying between a minimum and a maximum. In different examples, the range of $I_{VDD}$ may vary.

Figure 7:
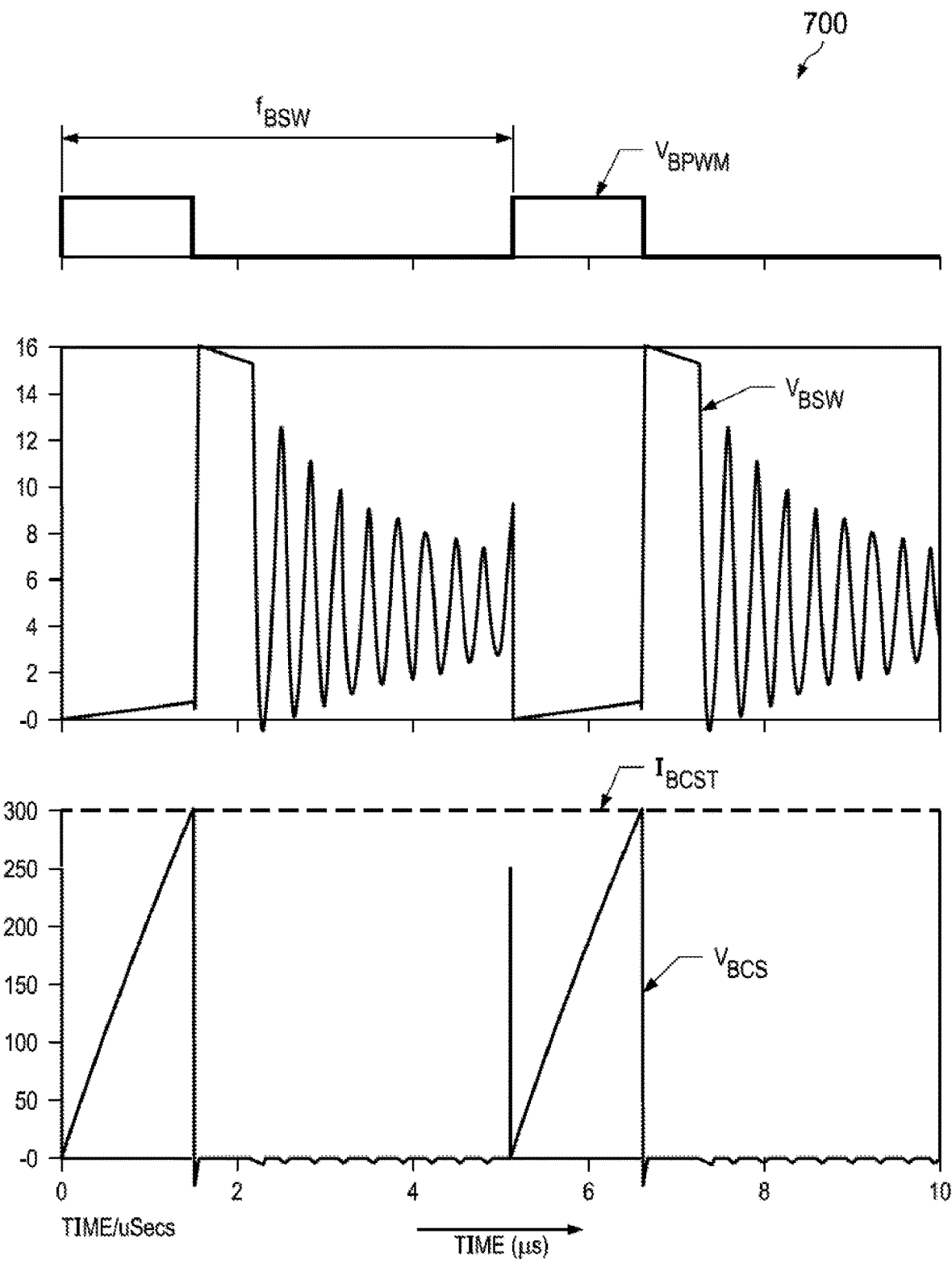
FIG. 7 is a timing diagram showing waveforms related to a constant peak-current modulation mode in some examples.

FIG. 7 is a timing diagram 700 showing waveforms related to a constant peak-current modulation mode in some examples. The represented waveforms are for $V_{BPWM}$, $V_{BSW}$, $I_{BCST}$ and $V_{BCS}$. As shown in the timing diagram 700, the waveform for $V_{BPWM}$ represents a pulse-width modulated signal with a period based on $f_{BSW}$. Also, $V_{BSW}$ (e.g., the voltage at the switch node 540 in FIG. 5) is low when $V_{BPWM}$ is high and oscillates when $V_{BPWM}$ is low. When $V_{BPWM}$ initially goes low, the current in the boost switch turns off and $V_{BSW}$ rises to a small voltage above $V_{VDD}$ as the current in the boost inductor transfers from the boost switch to the boost diode. The inductor current decays to zero as a function of the difference in voltage between $V_{VDD}$ and $V_{BIN}$. Once the current decays to zero the voltage on $V_{BSW}$ will begin to resonant.

Also, $I_{BCST}$ is represented as staying steady. Finally, $V_{BCS}$ is represented as linearly increasing when $V_{BPWM}$ is high, and staying low when $V_{BPWM}$ is low. Also, small pulses in $V_{BCS}$ are represented at each low-to-high transition of $V_{BPWM}$. With the constant peak-current modulation mode, the peak magnetizing current of the inductor is constant, so the on time is constant for a given regulator input voltage ($V_{BIN}$). Also, $f_{BSW}$ will vary depending on the output load of the isolated converter.

Figure 8:
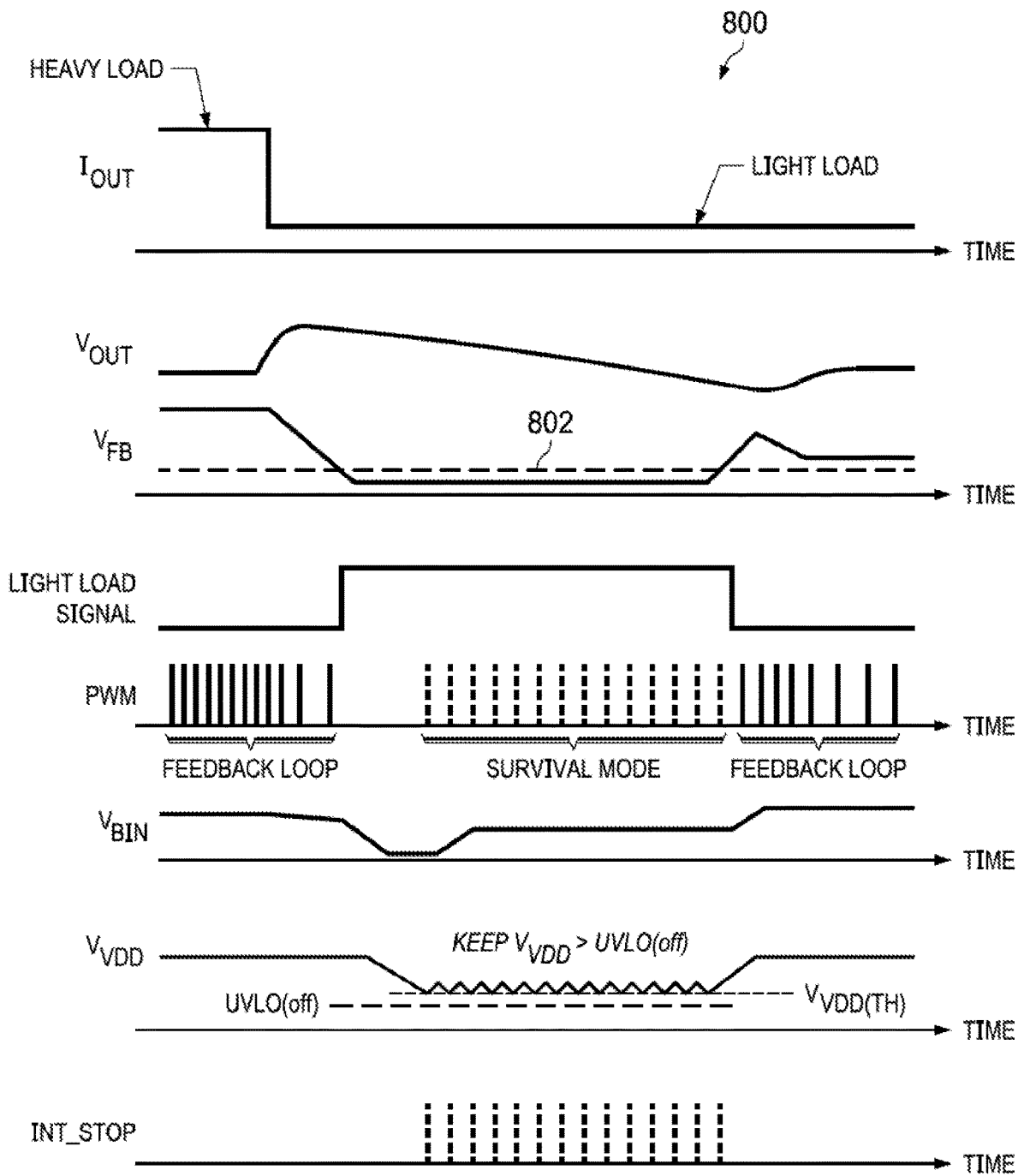
FIG. 8 is a timing diagram showing waveforms related to survival mode operations of a bias power regulator circuit in some examples.

FIG. 8 is a timing diagram 800 showing waveforms related to survival mode operations of a bias power regulator circuit (e.g., the bias power regulator circuit 422 in FIG. 4, or the bias power regulator circuit 500 in FIG. 5) in some examples. In the timing diagram 800, an isolated converter output current (IOUT) is represented as going from high (heavy load) to low (light load), which corresponds to a light load condition. In response to the light load condition, VOUT of the isolated converter begins to increase. Also, $V_{FB}$ decreases linearly from a high level to a low level below a threshold 802. Once $V_{FB}$ is below the threshold 802, a light load signal is asserted.

Also represented in the timing diagram 800 are spaced PWM signals. Initially, the timing of the PWM signals are based on a feedback loop (e.g., the feedback loop 406). Once the light load condition is reached, PWM signals based on the feedback loop stop until the light load condition ends. During the light load condition, PWM signals are periodically asserted as part of the survival mode operations described herein (e.g., to pass energy to $N_{AUX1}$, which is then regulated by the bias power regulator circuit to keep the PWM controller 410 on). Also represented in the timing diagram 800 is a $V_{BIN}$ waveform, which stays low throughout the time duration represented. Also, $V_{VDD}$ starts high before dropping during the light load condition. During the survival mode operations, $V_{VDD}$ is forced to stay above $V_{VDD(TH)}$, which is set above a UVLO off threshold. Also, pulse request signals (INT_STOP) related to the survival mode are represented in the timing diagram 800. The INT_STOP pulses are provided, for example, by a mode controller (e.g., the mode controller 426 in FIG. 4, or the mode controller 426A in FIG. 5) to a PWM controller (e.g., the PWM controller 410 in FIG. 4) to direct the PWM controller to temporarily turn on a switch (e.g., $Q_{L1}$) to provide energy pulses for survival mode operations, even though there is a light load condition for the isolated converter.

FIG. 9 is a timing diagram 900 showing waveforms related to a constant off-time modulation mode of a bias power regulator circuit (e.g., the bias power regulator circuit 422 in FIG. 4, or the bias power regulator circuit 500 in FIG. 5) in some examples. In the timing diagram 900, a forced CCM scenario with constant off-time modulation mode is represented. More specifically, an isolated converter PWM waveform is represented along with an INT_STOP waveform, a $V_x$ waveform, a $V_{BSW}$ waveform, a $V_{VDD}$ waveform, a UVLO off threshold, a $V_{BIN}$ waveform, and an $I_{LB}$ waveform.

As shown, the three PWM pulses are represented in the timing diagram 900, which occur while INT_STOP is asserted. In the diagram 900, $V_x$ corresponds to the output of the AND gate 504 in FIG. 5. Meanwhile, $V_{BSW}$ correspond to the voltage at a switch node (e.g., the switch node 540) of a bias supply modulation circuit. In the timing diagram 900, $V_{VDD}$ is represented as dropping below $V_{VDD(TH)}$, but not below the UVLO off threshold. In response to $V_{VDD}$ dropping below $V_{VDD(TH)}$, constant off-time modulation mode operations are used to keep $V_{VDD}$ above the UVLO off threshold. Over time, $V_{BIN}$ increases due to the PWM pulses. Also, $I_{LB}$ represents the current in forward path inductor (e.g., $L_B$) of a bias power regulator circuit (e.g., $L_B$ in FIGS. 4 and 5). As shown, $I_{LB}$ on average stays higher during constant off-time modulation mode to quickly provide energy to maintain $V_{VDD}$ above the UVLO off threshold.

In some examples, a system (e.g., the system 400) includes a load (e.g., RLOAD in FIG. 4) and an isolated converter (e.g., the isolated converter 401 in FIG. 4) coupled to the load. The isolated converter includes a power transformer (e.g., power transformer 405 in FIG. 4) with a primary winding (e.g., $N_{P1}$ in FIG. 4), a secondary winding (e.g., $N_{S1}$ in FIG. 4), and an auxiliary winding (e.g., $N_{AUX1}$ in FIG. 4). The system also includes a first switch (e.g., $Q_{L1}$ in FIG. 4) coupled to the primary winding and a switch controller (e.g., PWM controller 410 in FIG. 4) coupled to the first switch. The system also includes a bias power regulator circuit (e.g., the bias power regulator circuit 422 in FIG. 4, or the bias power regulator circuit 500 in FIG. 5) coupled to the auxiliary winding and the switch controller, where the bias power regulator circuit includes a second switch (e.g., Q1 in FIGS. 4 and 5). The bias power regulator circuit is configured to provide a bias supply output voltage (e.g., $V_{VDD}$ in FIG. 4) to the switch controller based on a first set of modes that modulate a switching frequency of the second switch and based on a forward mode in which the second switch stays off.

In some examples, the bias power regulator circuit comprises a mode controller (e.g., the mode controller 426 in FIG. 4) configured to select one of the first set of modes when a bias supply input voltage (e.g., $V_{BIN}$ in FIG. 4) provided by the auxiliary winding is less than a threshold (e.g., VBIN_TH). In some examples, the mode controller is configured to select a constant off-time modulation option of the first set of modes and to direct the switch controller (e.g., PWM controller 410 in FIG. 4) to provide pulses while the isolated converter is in a light load condition. In some examples, the constant off-time modulation option is used to keep the bias supply output voltage (e.g., $V_{VDD}$ in FIG. 4) above a UVLO off threshold for the switch controller. In some examples, the switch controller is configured to provide a light load signal to the mode controller, and wherein the mode controller is configured to provide periodic pulse requests (e.g., the pulse request signal in FIG. 4, or INT_STOP in FIGS. 5, 8, and 9) to the switch controller while the light load signal is asserted. In some examples, the mode controller is configured to select a constant peak-current modulation option of the first set of modes when the isolated converter is not in a light load condition. In some examples, the bias power regulator circuit is configured to adjust the switching frequency of the second switch (e.g., Q1 in FIGS. 4 and 5) while using the constant peak-current modulation option to maintain the bias supply output voltage at a target reference (e.g., $V_{REF}$ in FIG. 5). In different examples, the load is a USB PD adapter, an LED driver, or another load.

In some examples, a control circuit for an isolated converter with a power transformer having an auxiliary winding (e.g., the isolated converter 401 with power transformer 405 in FIG. 4) includes a bias supply input node (e.g., the $V_{BIN}$ node 416 in FIG. 4, or the $V_{BIN}$ node 538 in FIG. 5). The control circuit also includes a bias supply output node (e.g., the $V_{VDD}$ node 430 in FIG. 4, or the $V_{VDD}$ node 560 in FIG. 5). The control circuit also includes a PWM controller (e.g., the PWM controller 410 in FIG. 4) coupled to the bias supply output node. The control circuit also includes a bias power regulator circuit (e.g., the bias power regulator circuit 422 in FIG. 4, or the bias power regulator circuit 500 in FIG. 5) between the bias supply input node and the bias supply output node. The bias power regulator circuit includes a forward path (e.g., the forward path 428 in FIGS. 4 and 5) between the bias supply input node and the bias supply output node. The bias power regulator circuit also includes a switch (e.g., Q1 in FIGS. 4 and 5) coupled between the forward path and a ground node. The bias power regulator circuit also includes modulation circuitry (e.g., the modulation circuitry 424 in FIG. 4, the constant peak-current modulation circuit 512 in FIG. 5, and the constant off-time modulation circuit 502 in FIG. 5) coupled to a control terminal of the switch. The bias power regulator circuit also includes a mode controller (e.g., the mode controller 426 in FIG. 4, or the mode controller 426A in FIG. 5) coupled to the modulation circuit.

In some examples, the mode controller is coupled to the PWM controller and is configured to receive a light load signal from the PWM controller. In some examples, the mode controller is configured to send pulse requests to the PWM controller while the light load signal is asserted. In some examples, the mode controller is configured to select a constant off-time modulation mode of the modulation circuit while the light load signal is asserted and a voltage level at the bias supply input node is less than a threshold. In some examples, a constant off-time used in the constant off-time modulation mode keeps a bias supply output voltage at the bias supply output node greater than a UVLO off threshold for the PWM controller. In some examples, the mode controller is configured to select a constant peak-current modulation mode of the modulation circuitry when the light load signal is not asserted and a voltage level at the bias supply input node is less than a threshold. In some examples, the bias power regulator circuit is configured to adjust the switching frequency of the switch while using the constant peak-current modulation mode to maintain a bias supply output voltage at the bias supply output node at a target reference (e.g., $V_{REF}$ in FIG. 5). In some examples, the bias power regulator circuit is configured to use the forward path with the switch turned off if a voltage level at the bias supply input node is greater than a threshold.

In some examples, an integrated circuit includes a bias supply input node (e.g., the $V_{BIN}$ node 416 in FIG. 4, or the $V_{BIN}$ node 538 in FIG. 5) and a bias supply output node (e.g., the $V_{VDD}$ node 430 in FIG. 4, or the $V_{VDD}$ node 560 in FIG. 5). The integrated circuit also includes a bias power regulator circuit (e.g., the bias power regulator circuit 422 in FIG. 4, or the bias power regulator circuit 500 in FIG. 5) between the bias supply input node (e.g., the $V_{BIN}$ node 416 in FIG. 4, or the $V_{BIN}$ node 538 in FIG. 5) and the bias supply output node (e.g., the $V_{VDD}$ node 430 in FIG. 4, or the $V_{VDD}$ node 560 in FIG. 5), where the bias power regulator circuit includes a switch (e.g., Q1 in FIGS. 4 and 5). The bias power regulator circuit is configured to provide a bias supply output voltage to the bias supply output node based on modulating a switching frequency of the switch if a voltage level at the bias supply input node (e.g., $V_{BIN}$) is greater than a bias supply input threshold (e.g., VBIN_TH) and based on using a forward path with the switch off if the voltage level at the bias supply input node is not greater than the bias supply input threshold.

In some examples, the bias power regulator circuit includes modulation circuitry (e.g., the modulation circuitry 424, the constant off-time modulation circuit 502 of FIG. 5, the constant peak-time modulation circuit 512 of FIG. 5, and/or other components of the control circuit 423A in FIG. 5) configured to provide a plurality of modulation modes to modulate the switching frequency of the switch. The bias power regulator circuit also includes a mode controller (e.g., the mode controller 426 in FIG. 4, or the mode controller 426A in FIG. 5) configured to select one of the plurality of modulation modes.

In some examples, one of the plurality of modulation modes is a constant off-time modulation mode, where the mode controller is configured to select the constant off-time modulation mode while an isolated converter load condition is lighter than a load threshold and while a bias supply input voltage from the bias supply input node is less than the bias supply input threshold. In some examples, one of the plurality of modulation modes is a constant peak-current modulation mode, and wherein the mode controller is configured to select the constant peak-current modulation mode while an isolated converter load condition is not lighter than a load threshold and a bias supply input voltage at the bias supply input node is equal to or less than the bias supply input threshold. In some examples, the isolated converter switch controller is configured to provide a light load signal to the mode controller, and wherein the mode controller is configured to provide periodic pulse requests to the isolated converter switch controller while the light load signal is asserted.

The described bias power regulator circuit examples are distinct from previously bias power regulators because the modulation circuitry and related control schemes convert a wide auxiliary winding voltage (used to obtain $V_{BIN}$) of an isolated converter with a wide output voltage into a usable bias supply output power ($V_{VDD}$) for PWM controllers. In contrast, other bias power regulators involves lossy linear regulators and/or multiple auxiliary windings.

As described herein, a bias power regulator circuit with the modes described herein (e.g., the forward mode, the constant off-time modulation mode, and the constant peak-current modulation mode) is more power efficient than other bias power regulators. Also, the described bias power regulator circuit has a smaller footprint (lower costs and smaller size solutions) for an isolated converter with a wide output voltage range to support devices such as USB PD adapters or LED drivers. As described herein, modulation circuitry that support constant peak-current modulation and constant off-time modulation helps to maintain $V_{VDD}$ regulation for a wide output range, and provides fast power delivery in transient events. In this manner, the main PWM controller of an isolated converter can obtain a reliable bias power source. Also, as described herein, the survival mode operations may be used to automatically create energy delivery to the bias supply input node (forcing the bias regulator to transfer energy simultaneously), which prevent the bias supply output power from dropping below a UVLO off threshold when an isolated converter enters into the light load operation.

With the bias power regulator circuit options described herein, power loss during bias power regulator options is reduced and the system efficiency improved. Also, the regulator component size is reduced (less PCB footprint) compared to other bias power regulator. Also, the auxiliary winding structure of the power transformer is simplified. Also, a wider range of operations and fast transient response is possible with the bias power regulator circuit described herein.

In this description, the term "couple" may cover connections, communications, or signal paths that enable a functional relationship consistent with this description. For example, if device A generates a signal to control device B to perform an action, then: (a) in a first example, device A is coupled to device B; or (b) in a second example, device A is coupled to device B through intervening component C if intervening component C does not substantially alter the functional relationship between device A and device B, such that device B is controlled by device A via the control signal generated by device A.

Modifications are possible in the described embodiments, and other embodiments are possible, within the scope of the claims.

What is claimed is:

1. An isolated converter comprising:
a power transformer having a primary winding, a secondary winding, and an auxiliary winding;
a first switch coupled to the primary winding;
a switch controller coupled to the first switch; and
a bias power regulator coupled to the auxiliary winding and the switch controller, the bias power regulator including a second switch, and the bias power regulator configured to provide a bias supply output voltage to the switch controller responsive to: a set of modes that modulate a switching frequency of the second switch; and a forward mode in which the second switch is off.

2. The isolated converter of claim 1, wherein the bias power regulator includes a mode controller configured to select one of the set of modes while a bias supply input voltage provided by the auxiliary winding is less than a threshold.

3. The isolated converter of claim 2, wherein the mode controller is configured to select a constant off-time modulation mode from among the set of modes and to direct the switch controller to provide pulses while the isolated converter has a light load condition, and the bias power regulator is configured to maintain the bias supply output voltage above an undervoltage lockout (UVLO) off threshold for the switch controller in the constant off-time modulation mode.

4. The isolated converter of claim 3, wherein the switch controller is configured to provide a light load signal to the mode controller, and the mode controller is configured to provide periodic pulse requests to the switch controller responsive to the light load signal.

5. The isolated converter of claim 2, wherein the mode controller is configured to select a constant peak-current modulation mode from among the set of modes while the isolated converter does not have a light load condition, and the bias power regulator is configured to adjust the switching frequency of the second switch while maintaining the bias supply output voltage at a target reference in the constant peak-current modulation mode.

6. The isolated converter of claim 1, wherein the isolated converter is adapted to be coupled to a load that includes a USB power delivery adapter.

7. The isolated converter of claim 1, wherein the isolated converter is adapted to be coupled to a load that includes a light-emitting diode (LED) driver.

* * * * *